July 6, 1926. 1,591,256
A. ZANELLA
TRANSMISSION AND SPEED CONTROL DEVICE
Filed April 30, 1923  3 Sheets-Sheet 1
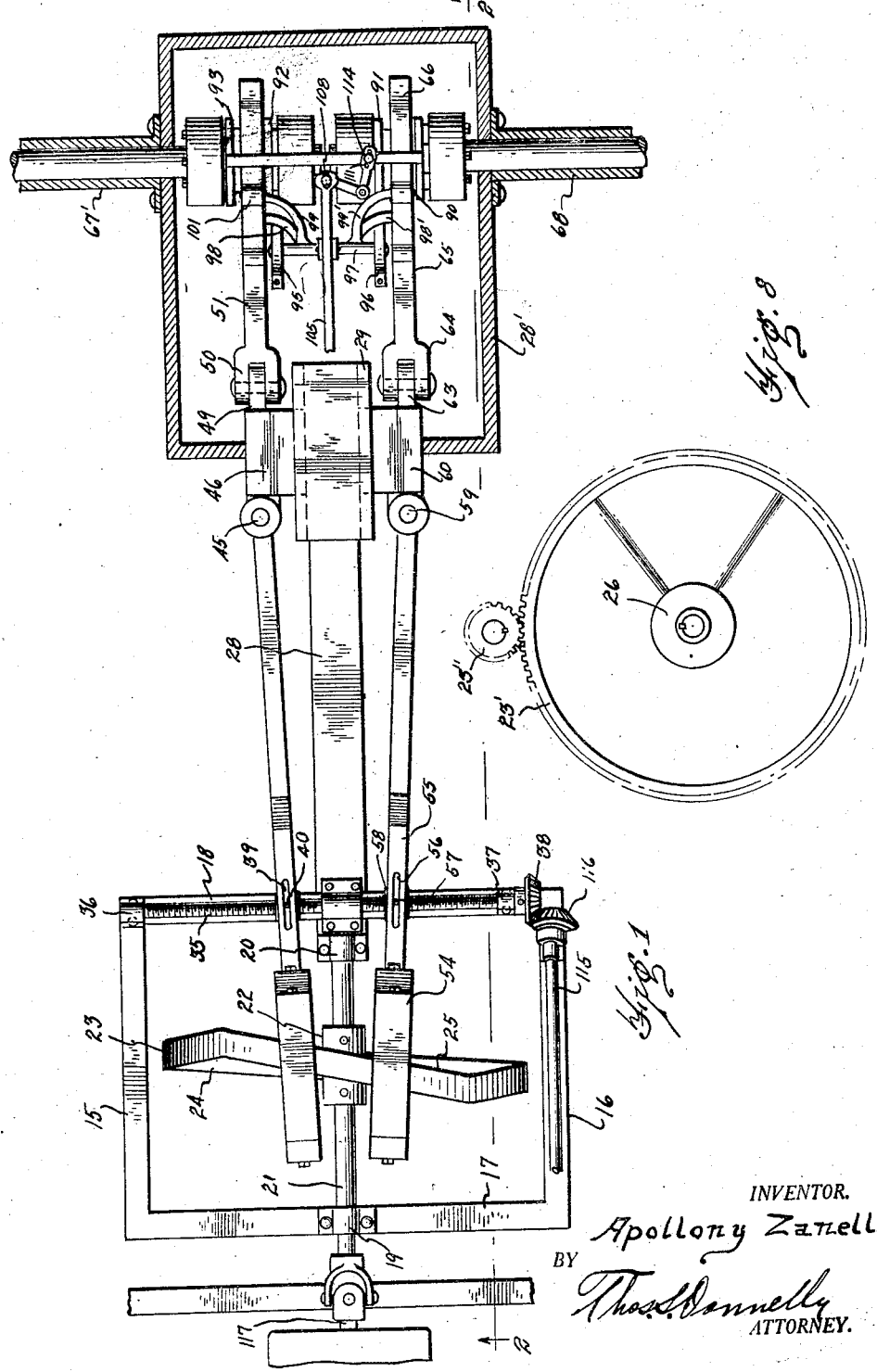
INVENTOR.
Apollony Zanella
BY
Thos. S. Donnelly
ATTORNEY.

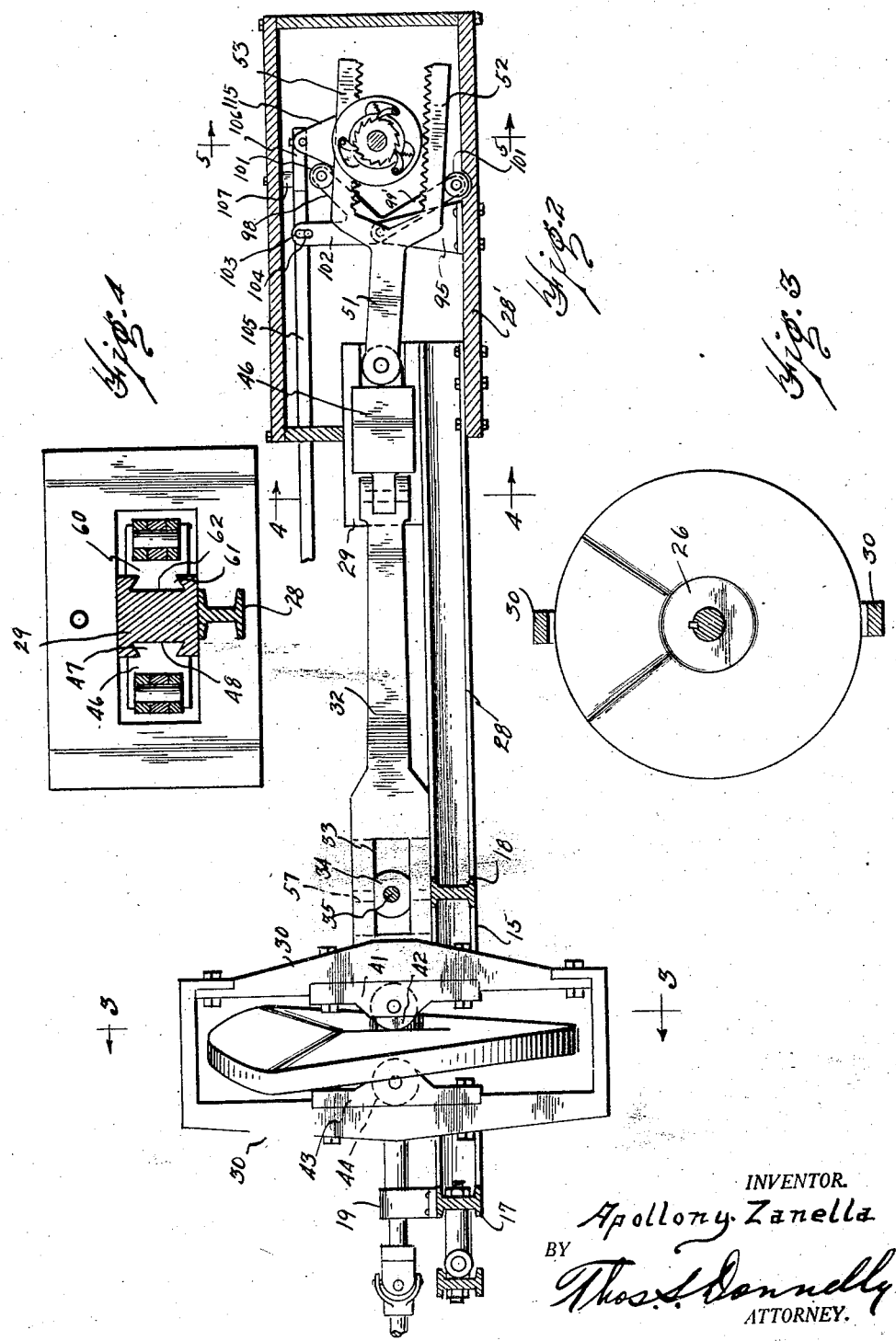

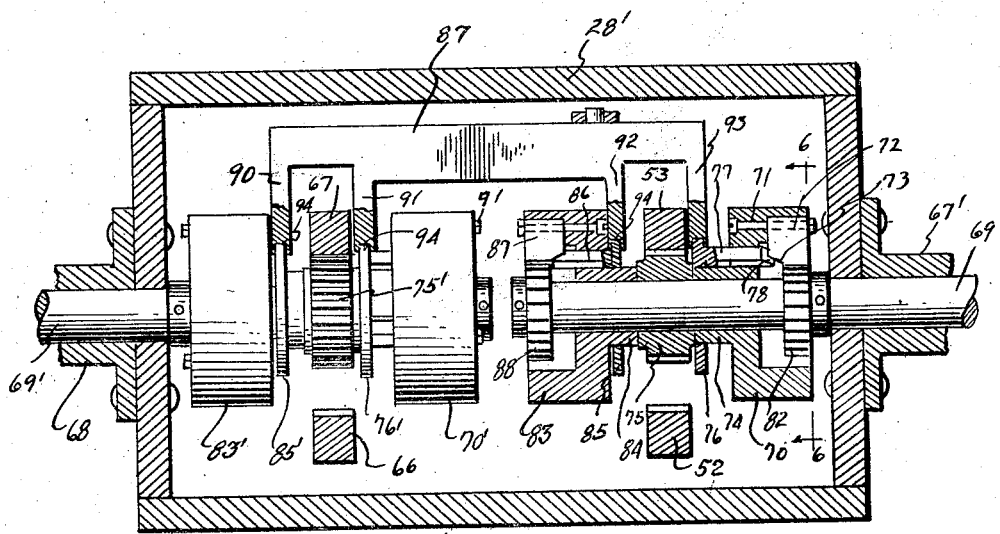

Patented July 6, 1926.

1,591,256

UNITED STATES PATENT OFFICE.

APOLLONY ZANELLA, OF DETROIT, MICHIGAN.

TRANSMISSION AND SPEED-CONTROL DEVICE.

Application filed April 30, 1923. Serial No. 635,558.

My invention relates to a new and useful improvement in a transmission and speed control and has for its object the provision of a rotating surface moving in varying planes for operating the motive members which transmit directly to the driven axle of a vehicle.

Another object of the invention is the provision in a vehicle of means for transmitting power to the rear wheels thereof and affording a positive drive to one of said wheels irrespective of the speed of rotation of the other of said wheels.

Another object of the invention is the provision of a power transmitting device having a rotating body with surfaces adapted for moving in different planes as the rotation proceeds and means for moving the driven members relatively of the surface of said rotating body.

Another object of the invention is the provision in a device of this class of a rotating means adapted for actuating a pair of reciprocating members and embodying a set of pawls and having means for releasing said pawls preliminary to a shifting of said reciprocating means for reversing the direction of the driven parts.

Other objects will appear hereinafter.

The invention consists in the combination and arrangement of parts hereinafter described and claimed.

The invention will be best understood from a reference to the accompanying drawings which form a part of this specification and in which, Fig. 1 is a top plan view of a device embodying the invention, Fig. 2 is a side elevational view taken on substantially line 2—2 of Fig. 1, Fig. 3 is a view taken on substantially line 3—3 of Fig. 2 showing parts in section and parts in elevation, Fig. 4 is a sectional view taken on substantially line 4—4 of Fig. 2, Fig. 5 is a sectional view taken on substantially line 5—5 of Fig. 2, Fig. 6 is a side elevational view of the ratchet and pawls used in the invention, taken on line 6—6 of Fig. 5.

Fig. 7 is a perspective view of the pawl operating device used in the invention, and Fig. 8 is a side elevational view of a modified form of wheel used in the invention.

Fig. 9 is a sectional view taken through Fig. 6.

The invention is adaptable for transmitting the power to the driven axle, which is usually the rear axle, of a power driven vehicle and embodies means for regulating the speed with which the vehicle is driven. In the present invention there is utilized a rotating member having the surfaces thereof adapted to move in irregular planes to give a cam effect so as to reciprocate members which are designed to actuate the immediate driving mechanism which is attached to the driven shaft.

The invention, in its preferred form, comprises a frame formed from I-beams 15, 16, 17 and 18, which are joined together at their ends in any convenient and substantial manner. Journaled in bearings 19 and 20, which are mounted on said frame, is a shaft 21, upon which is fixedly mounted a wheel 23 having a hub 22 through which the shaft projects and which is keyed or otherwise secured to said shaft. The faces of the wheel are provided at their center with a portion of the surface 26, which extends vertically to the shaft passing through the wheel. This portion 26 is what is termed, hereinafter, the neutral portion or zone. The face of the wheel outside of this neutral zone is divided into two portions, the portion 24 forming an incline rising to a point or plane removed from the plane of the neutral zone sufficient distance to permit the portion 25 which inclines downwardly to the original plane to take an abrupt drop. The rising portion 24 of the wheel embraces about four-fifths of the wheel and the abruptly sloping portion the other fifth. Projecting outwardly from and attached to the beam 18 is an I-beam or bar 28, the lower end of which is attached to the housing 28'. Mounted on the member 28, adjacent the end thereof is a guide member 29. A frame 30 is mounted on an arm or pitman 32 which is provided adjacent one end with a slot 33 in which rides a nut 34 which is mounted on a shaft 35, which is provided with an exterior thread for co-operation with the interior thread of the nut. The shaft 35 is journaled in suitable bearings 36 and 37 which are mounted on the beam 18. The pitman 32 is provided with a longitudinally extending slot 39 through which projects a stud 40 which is mounted on the nut 34, so as to prevent the nut from turning when the shaft 35 is turned and at the same time to permit reciprocation of the pitman. Mounted on the shaft 35 is a bevel gear 38, adapted for turning with said shaft. Mounted on one side of the frame 30, interiorly thereof, is a bearing 41 in which is rotatably mounted a roller 42 which is adapted to engage one surface of the wheel 23 and mounted on the other side of the frame 30 is another bearing 43 in which a similar roller 44 is rotatably mounted and adapted for engagement with the other surface of the wheel 23.

The pitman 32 is pivotally mounted at 45 to a lug formed on a guide member 46, said member having another lug 49 which is positioned between and pivotally mounted to a bifurcation 50 of an arm 51 which is provided with bifurcations formed into rack bars 52 and 53.

A second pitman 55 is provided with a frame 54 provided with bearings and rollers as is the frame 30. The pitman 55 is also provided with an elongated longitudinal slot 56 in which rides a stud 57 mounted on the nut 58 which rides in a slot formed in the pitman and is threaded upon the shaft 35, the construction and arrangement of these parts being as already described for the pitman 32. The pitman 55 is pivotally mounted at 59 to a lug which projects from the guide 60 which is provided with a lug 63 which is positioned between and pivotally mounted to a bifurcated lug or end 64 of an arm 65 which is bifurcated at its lower end to form rack bars 66 and 67 similar to the rack bars already described.

The guide member 46 is provided with a dove-tailed tongue 47 adapted for engagement, slidably in a dove-tail groove 48 formed in the guide 29. The guide 60 is also provded with a dove-tailed tongue adapted for slideable movement in the dove-tailed groove 62 formed in the guide 29, this tongue 61 and the tongue 47 being integral with the bodies from which they project.

Mounted upon the housing, at opposite sides thereof, are tubular guide members 67′ and 68. Projected through the member 67′ and into the interor of the housing 28′ is a shaft or rear axle of the vehicle. Loosely mounted upon the axle 69 is a housing or drum 70. Pivotally mounted upon the drum 70, by means of bolts 71 are a plurality of dogs 72 having an under beveled surface 73 adjacent the end. Projecting outwardly from the drum, and integral therewith is hub 74 which is fixedly attached or made integral with a gear 75 which is also loosely positioned on the axle. Mounted upon the hub 74, slidable relatively thereto, is an annular member 76 carrying a number of wedge shaped members 77, each of which is provided with a beveled surface adjacent its end and adapted to project through the wall of the housing or drum so that the beveled surface 78 may engage the beveled surface of the dogs or pawls for raising in the same into inoperative position. The wall of the drum is provided with a number of recesses 80 on the inner surface thereof, for the accommodation of the pawls 72 when moved to inoperative position, a spring being positioned in the recesses formed in the wall 79 to maintain said pawls normally in operative position, said pawls when moved to inoperative position serving to compress the springs 81. Mounted fixedly on the shaft 69 is a ratchet 82, with the teeth of which the pauls 72 engage when in normal position. Another drum 83 is loosely mounted on the shaft 69 and provided with a hub 84 which is attached to and preferably made integral with the gear 75. An annular member 85 is loosely mounted on said hub and provided with outwardly extending wedges 86 adapted to project through the wall of the drum 83 and to engage another set of pawls 87 which are adapted to engage, when in normal position with the ratchet 88 fixedly mounted on the shaft 69. The pawls 87 are each provided with a beveled surface and the ends of the wedges are tapered as are the wedges 77 so that the same may serve to lift the pawls free from the ratchet 88.

Projecting through the housing at the opposite side thereof is another shaft or axle 69′ which extends through the tubular guide 68. Another pair of drums 83′ and 70′ are also mounted loosely on the shaft 69′ and provided with the same mechanism as already described as being associated with these drums, the drums and associated mechanism being the same at opposite sides of the vehicles, the rear axle of the vehicle being in two separate parts 69 and 69′.

A yoke 87 is slidably mounted in the housing and is provided with legs 90, 91, 92 and 93 which project therefrom and are formed substantially semi-circular, each being provided with a channel 94 in which the ring 76, 85, 76′ or 85′ engages. Mounted in the housing are supporting members or brackets 95 and 96 in which is supported an arbor 97 and projecting from which are arms 98, 99, 98′ and 99′, each of said arms being provided with a roller 101 adapted to engage the surface of a rack bar. Fixedly mounted on the arbor is an arm 102 the free end of which is provided with a slot extending longitudinally thereof, said slot 103 having a stud 104 riding therein which projects from a lever 105. A bell crank 106 is mounted pivotally on the wall of said housing and spaced therefrom by a suitable spacer 107. A stud 108 connects one end of said bell crank to the lever 105 by means of a stud which projects therefrom and rides in an elongated slot formed in said lever, said slot being of considerably larger diameter than said stud so as to allow plenty of play of the same in the slot. The other end of the bell crank is provided with a slot 111 extending longitudinally thereof, a stud projecting from the yoke riding in said slot, so that a movement of the bell crank is transmitted through the stud 114 to the yoke.

Journaled in a suitable bearing mounted on the I-beam 16 is a shaft 115 which carries at its end a gear 116 adapted to mesh with the gear 38. The shaft extends to any convenient place where it is easily reached by the operator of the vehicle, a suitable crank, not shown, as it is of well known structure, being mounted on said shaft 16 so as to provide means for rotating the same to bring about a rotation of the shaft 35. Upon a rotation of the shaft 35 the position of the frames 30 and 54 are adjusted relatively to the wheel 23, the nuts 58 and 34 serving to move the frames and the pitmen connected thereto, as the shaft 35 is rotated.

A shaft 117 is attached to the motor of the vehicle so as to be rotated thereby, and it is connected by means of a universal joint to the shaft 21.

In operation the motor is started and the shaft 21 is set into rotation, thus rotating the wheel 23. If the frames 30 and 54 have their roller bearings on the neutral zone of the wheel 23 the rotation of the wheel will have no effect on the pitmen connected to these frames. As the shaft 115 is rotated the rollers of the frames 30 and 54 are carried outwardly toward the periphery of the wheel and they are then brought into contact with the surface 24. As the wheel rotates they are brought into engagement with the rise of this surface 24 causing a movement on the pitmen in one direction. When the wheel rotates so as to bring the fall of the surface, or the portion 25 into engagement with the rollers, the pitmen are suddenly moved in the opposite direction an equal distance. It is thus seen that the pitmen are reciprocated by the rotation of the wheel and that their movement is gradual in one direction and very abrupt in the other direction. When moving in the direction in which the movement is gradual the pitmen are then making their working stroke and when moving in the other direction, abruptly, they are making the return or idle stroke. During this reciprocal movement the pitmen are each in mesh, through one of its rack bars, with the gear 75 or 75'. One set of the pawls cooperating with each of the gears 75 and 75' is in engagement with its ratchet so that when the pitman moves in one direction the ratchet, and thereby the axle of the vehicle, moves or rotates in one direction, thus serving to propel the vehicle. When the pitman is making the idle stroke the pawls ride freely over the teeth of the ratchet.

The lever 105 which extends to some convenient place that is accessible to the operator of the vehicle, when operated by the driver of the vehicle serves to render one set of the pawls inoperative and to move the other set into operative position. This lever also serves to move one of the rack bars of each pitman from operative to inoperative position, so as to cause the rotation of the gears 75 and 75' in the opposite direction, thus reversing the direction of drive of the vehicle. In this connection it is to be noted that the ratchets on each axle are oppositely faced and the pawls cooperating therewith are also oppositely faced. As shown in the drawings the ratchet and pawls associated with the drums 70 and 70' are in operative position and the ratchet and pawls associated therewith, in drums 83 and 83' are in inoperative position. By moving the lever 105 the arm 102 is first moved so as to disengage the rack bars 53 and 67 from the gears 75 and 75'. As the movement of the lever 105 continues the yoke is moved slideably so as to bring the wedges 77 and 77' into engagement with the pawls in the drums 70 and 70', at the same time removing the wedges from engagement with the pawls 86 and 86' so as to allow them to move in response to the pressure of the springs into operative position. As the movement of the lever continues the arm 102 moves the rack bars 52 and 66 into engagement with their respective gears 75 and 75'. The rack bars are moved first owing to the slot 109 being elongated longitudinally of the lever and of larger diameter than the stud 108, the rack bars being moved while the play in the slot is being taken up. The throw of the bell crank is such that after the slack is taken up the yoke moves more quickly than the arbor actuating the rack bars, so as to bring the wedges into engagement with the pawls before the rack bars are engaged with the gear, thus eliminating any binding of the pawls during the moving of the same from operative to inoperative position.

In Fig. 8 I have shown a modified form of the device which may be utilized in cases where the engine is put to severe tests, such as in trucks, tractors and the like. In this case the wheel 23' is toothed on its periphery which meshes with a gear 23" which is driven by the engine.

Having thus described my invention what I claim as new and desire to secure by Letters Patent is:

1. In a device of the class described, a pair of axles, a ratchet fixedly mounted on each of said axles; a set of pawls for rotating each of said ratchets; a gear for rotating said pawls; a pair of rack bars for rotating said gear, one positioned on one side of said gear and the other on the other side of said gear, one of said rack bars, when in engagement with said gear, serving for rotating the same in one direction and the other, when in engagement with said gear, serving for rotating said gear in the opposite direction, and means operable at will for moving said pawls to operative and inoperative position.

2. In a device of the class described, a pair of axles, a ratchet fixedly mounted on each of said axles, a set of pawls for rotating each of said ratchets; a gear for rotating said pawls; a pair of rack bars for rotating said gear, one positioned on one side of said gear and the other on the other side of said gear, one of said rack bars, when in engagement with said gear, serving for rotating the same in one direction and the other, when in engagement with said gear, serving for rotating said gear in the opposite direction and means operable at will and moving said pawls to operative and inoperative position, and means for reciprocating said rack bars for effecting a rotation of said gear.

3. In a device of the class described, a pair of axles, a ratchet fixedly mounted on each of said axles; a set of pawls for rotating each of said ratchets; a gear for rotating said pawls; a pair of rack bars for rotating said gear, one positioned on one side of said gear and the other on the other side of said gear, one of said rack bars, when in engagement with said gear, serving for rotating the same in one direction and the other, when in engagement with said gear, serving for rotating said gear in the opposite direction; means operable at will for moving said pawls to operative and inoperative position; means for reciprocating said rack bars for effecting a rotation of said gear, one of said rack bars being operative during movement in one direction and the other being operative during movement in the opposite direction.

4. In a device of the class described, a pair of axles, a ratchet fixedly mounted on each of said axles; a set of pawls for rotating each of said ratchets; a gear for rotating said pawls; a pair of rack bars for rotating said gear, one positioned on one side of said gear and the other on the other side of said gear, one of said rack bars, when in engagement with said gear, serving for rotating the same in one direction and the other, when in engagement with said gear, serving for rotating said gear in the opposite direction, means operable at will for moving said pawls to operative and inoperative position, and means for reciprocating said rack bars for effecting a rotation of said gear, one of said rack bars being operative during movement in one direction and the other being operative during movement in the opposite direction; and a rotatable member having a cam bearing surface for effecting reciprocation of said rack bars.

In testimony whereof I have signed the foregoing specification.

APOLLONY ZANELLA.